US009083396B2

(12) United States Patent
Goldhamer

(10) Patent No.: US 9,083,396 B2
(45) Date of Patent: Jul. 14, 2015

(54) OFDMA-BASED OPERATION OF A WIRELESS SUBSCRIBER TERMINAL IN A PLURALITY OF CELLS

(75) Inventor: Mariana Goldhamer, Ramat Gan (IS)

(73) Assignee: ALVARION LTD. (IL)

( * ) Notice: Subject to any disclaimer, the term of this patent is extended or adjusted under 35 U.S.C. 154(b) by 609 days.

(21) Appl. No.: 12/559,883

(22) Filed: Sep. 15, 2009

(65) Prior Publication Data
US 2010/0067592 A1 Mar. 18, 2010

(30) Foreign Application Priority Data

Sep. 15, 2008 (IL) .......................................... 194097

(51) Int. Cl.
H04W 72/04 (2009.01)
H04B 7/12 (2006.01)
H04B 7/02 (2006.01)
H04B 7/04 (2006.01)
H04W 99/00 (2009.01)
H04L 5/00 (2006.01)
H04W 72/02 (2009.01)
H04W 88/04 (2009.01)
H04W 88/06 (2009.01)

(52) U.S. Cl.
CPC .............. H04B 7/022 (2013.01); H04B 7/0495 (2013.01); H04L 5/0053 (2013.01); H04L 5/0073 (2013.01); H04W 72/0426 (2013.01); H04W 99/00 (2013.01); H04L 5/0007 (2013.01); H04L 5/0044 (2013.01); H04L 5/0094 (2013.01); H04W 72/02 (2013.01); H04W 88/04 (2013.01); H04W 88/06 (2013.01)

(58) Field of Classification Search
None
See application file for complete search history.

(56) References Cited

U.S. PATENT DOCUMENTS

| 2002/0077112 | A1* | 6/2002 | McIntosh et al. | 455/453 |
| 2006/0203758 | A1* | 9/2006 | Tee et al. | 370/315 |
| 2006/0223520 | A1* | 10/2006 | Laroia et al. | 455/422.1 |
| 2007/0026896 | A1* | 2/2007 | Han et al. | 455/561 |
| 2007/0253355 | A1* | 11/2007 | Hande et al. | 370/328 |
| 2008/0112359 | A1* | 5/2008 | Cleveland et al. | 370/329 |
| 2008/0151743 | A1* | 6/2008 | Tong et al. | 370/204 |
| 2008/0273517 | A1* | 11/2008 | Nishio et al. | 370/345 |
| 2009/0016268 | A1* | 1/2009 | Yi et al. | 370/328 |
| 2009/0279461 | A1* | 11/2009 | Rao et al. | 370/295 |
| 2010/0111027 | A1* | 5/2010 | Hart | 370/329 |
| 2010/0166087 | A1* | 7/2010 | Lomnitz | 375/260 |

(Continued)

Primary Examiner — Duc Duong
(74) Attorney, Agent, or Firm — Hershkovitz & Associates, PLLC; Abe Hershkovitz

(57) ABSTRACT

A method for carrying out concurrent communications between a subscriber device and two base stations is disclosed. At least one OFDM/OFDMA sub-channel is selected for each of the two base stations which is associated with a communications sector belonging to one of the two base stations and comprises OFDM/OFDMA sub-carriers that are substantially different from sub-carries comprised in the OFDM/OFDMA sub-channel associated with a communications sector belonging to the other base station; establishing a communication path between the subscriber device and each of the two base stations along the respective sub-channel selected; receiving/transmitting control messages exchanged between the subscriber device and the two base stations, wherein at least one control message is exchanged between the subscriber device and one of the two base stations concurrently with at least one control message exchanged between the subscriber device and the other base station, and wherein the control messages are exchanged along different sub-channels comprised in the communication paths.

8 Claims, 2 Drawing Sheets

(56) References Cited

U.S. PATENT DOCUMENTS

| | | | |
|---|---|---|---|
| 2010/0216470 A1* | 8/2010 | Pamp et al. | 455/436 |
| 2010/0265851 A1* | 10/2010 | Shahar | 370/278 |
| 2010/0278123 A1* | 11/2010 | Fong et al. | 370/329 |

* cited by examiner

OFDMA-BASED OPERATION OF A WIRELESS SUBSCRIBER TERMINAL IN A PLURALITY OF CELLS

FIELD OF THE INVENTION

The present invention relates generally to wireless communications, and in particular, to OFDM/OFDMA wireless networks that allow a single subscriber device to communicate with a plurality of base stations.

BACKGROUND OF THE INVENTION

In the Legacy IEEE 802.16 standard the full OFDMA Fractional Frequency Reuse ("FFR") potential is not exploited due to the fact that an MS/SS (mobile station/subscriber station) may select only one base station to communicate with and hence, in a given radio frame, such an MS/SS is capable of decoding only the data/control streams transmitted by that one base station. Nevertheless, the FFT processing is carried out for the entire frequency channel.

Therefore it is required to provide a solution to enhance the performance of such wireless systems by processing multiple streams at the same time or even multiple streams in different sub-frames of the same radio frame.

SUMMARY OF THE INVENTION

It is therefore an object of the present invention to provide a method and apparatus to enable better performance of radio terminals when exchanging communications.

It is another object of the present invention to enable a single subscriber device to communicate with at least two base stations within the same radio frame, without being required to stringently synchronize the communications exchanged between these at least two base stations and the subscriber device at physical OFDM symbol level.

It is yet another object of the present invention to allow using a subscriber device as a relay station for conveying communications between one base station to another.

Other objects of the invention will become apparent as the description of the invention proceeds.

According to a first embodiment of the present invention there is provided in a wireless network which comprises at least two base stations and at least one subscriber device, wherein said at least one subscriber device is operative to concurrently communicate with each of said at least two base stations, a method for carrying out communications therebetween. The method comprises the steps of:

for each of the two base stations, providing a plurality of OFDM/OFDMA sub-channels for exchanging communications with a plurality of subscriber devices;

for each of the at least two base stations selecting at least one of the plurality of OFDM/OFDMA sub-channels, wherein the at least one OFDM/OFDMA sub-channel is associated with a communications sector belonging to one of the at least two base stations and comprises OFDM/OFDMA sub-carriers that are substantially different from sub-carries comprised in at least one OFDM/OFDMA sub-channel associated with a communications sector belonging to another of the at least two base stations;

establishing a communication path between the at least one subscriber device and each of the at least two base stations along the selected at least one sub-channel associated with the respective base station; and receiving at/transmitting from the at least one subscriber device, control messages conveyed from/to the at least two base stations, wherein at least one control message is conveyed between the subscriber device and one of the at least two base stations concurrently with at least one control message conveyed between the subscriber device and one other of the at least two base stations, and wherein the at least two control messages are conveyed along different sub-channels comprised in the communication paths established between the at least one subscriber device and the at least two base stations.

According to another embodiment of the invention, the control messages transmitted from each of the at least two base stations comprise scheduling information which has been conveyed along at least one sub-channel selected from among the plurality of sub-channels.

Preferably, the at least one subscriber device is further operative to communicate with each of the at least two base stations by using a plurality of sub-channels and/or different sub-frames within radio frames.

In accordance with another embodiment, at least one of the communication paths established, comprises a relay station. Preferably, the relay station is selected from the plurality of subscriber devices.

By yet another preferred embodiment of the method provided by the present invention, communications (e.g. data traffic) received or transmitted by the at least one subscriber device from/to the at least two base stations is conveyed via at least one network element, preferably being a router or a gateway, that is operative to assemble or disassemble these communications.

According to another embodiment of the invention there is provided a subscriber device capable of concurrently communicating in a wireless network with at least two base stations and comprising:

at least one radio transceiver adapted to transmit communications traffic towards each of the at least two base stations and receive communications traffic therefrom, and wherein the transmission and reception of communications exchanged between the subscriber device and each of the at least two base stations are carried concurrently along at least one OFDM/OFDMA sub-channel selected from among a plurality of OFDM/OFDMA sub-channels and associated with a communications sector belonging to one of the at least two base stations and comprises OFDM/OFDMA sub-carriers that are substantially different from sub-carries comprised in at least one OFDM/OFDMA sub-channel associated with a communications sector belonging to another of the at least two base stations;

and wherein the at least one radio transceiver is operative to receive/transmit control messages conveyed from/to the at least two base stations, and wherein at least one control message is conveyed between the subscriber device and one of the at least two base stations concurrently with at least one control message conveyed between the subscriber device and one other of the at least two base stations, and wherein the at least two control messages are conveyed along different sub-channels comprised in the communication paths established between the at least one subscriber device and the at least two base stations.

Preferably, the at least two control message include scheduling information received from the respective base station from among the at least two base stations.

According to still another embodiment, the subscriber device is adapted to operate as a relay for communications to be conveyed from one of the at least two base stations to the other of the at least two base stations.

In accordance with yet another embodiment of the invention there is provided a base station adapted to operate in a wireless network and comprising:

at least one radio transceiver capable of transmitting communications towards at least one subscriber device and receive communications therefrom;

at least one processor adapted to:

select at least one OFDM/OFDMA sub-channel out of a plurality of OFDM/OFDMA sub-channels available at the base station for exchanging communications with a plurality of subscriber devices and wherein the at least one OFDM/OFDMA sub-channel selected is associated with a communications sector belonging to the base station and comprises OFDM/OFDMA sub-carriers that are substantially different from sub-carries comprised in at least one OFDM/OFDMA sub-channel associated with a communications sector belonging to at least one other base stations;

establish a communication path between the base station and the at least one subscriber device along the at least one sub-channel selected;

and wherein the at least one transceiver is operative to receive/transmit control messages conveyed from/to the at least one subscriber device, and wherein at least one control message is conveyed between the base station and the at least one subscriber device concurrently with at least one control message conveyed between at least one other base station and the at least one subscriber devices, and wherein the at least two control messages are conveyed along different sub-channels comprised in communication paths established between the at least one subscriber device and the at least two base stations.

Preferably, the at least two control messages include scheduling information transmitted to the at least one subscriber device.

In accordance with yet another preferred embodiment, the base station is further adapted to operate as a relay station for conveying communications to/from a second base station which communicates with the at least one subscriber device simultaneously with that base station.

According to a preferred embodiment of the present invention, the at least two concurrent control messages are conveyed simultaneously.

DETAILED DESCRIPTION OF THE DRAWINGS

A better understanding of the present invention may be obtained when the following non-limiting detailed description is considered in conjunction with the accompanying drawings.

Different Frequency Resources

In Reuse N (where N is an integer denoting the reuse level), the OFDMA sub-channels are assigned to various sectors of a base station. A group of such OFDMA sub-channels will be referred to hereinafter as a "SET".

The combination of sub-channels which are dedicated for the usage of a specific sector creates a dedicated sub-channel SET. The base station sector that uses the SET in this mode is referred to as a master sector. A base station may use the dedicated SET of another base station as long as this use does not create major interference to the master base station. The non-interfering base station is operating under the so called "slave" mode. The "slave" mode of operation may be achieved by using reduced power or space separation, for example by using Advanced Antenna Techniques.

A Mobile Subscriber (MS) can encode/decode messages derived from at least two different data streams, each transmitted to or received from a different base station/relay station, and which are transmitted or received while using different master SETs.

The internal device state machine is beyond the scope of the present invention. Still, it is worth mentioning that some binding rules that relate to the traffic scheduling, preferably rely on using the same hardware as known in the art per se for decoding two different streams. Obviously, as will be appreciated by those skilled in the art, the simple solution would be that the decoder is switched repeatedly between the two data/control streams.

Figure 1:
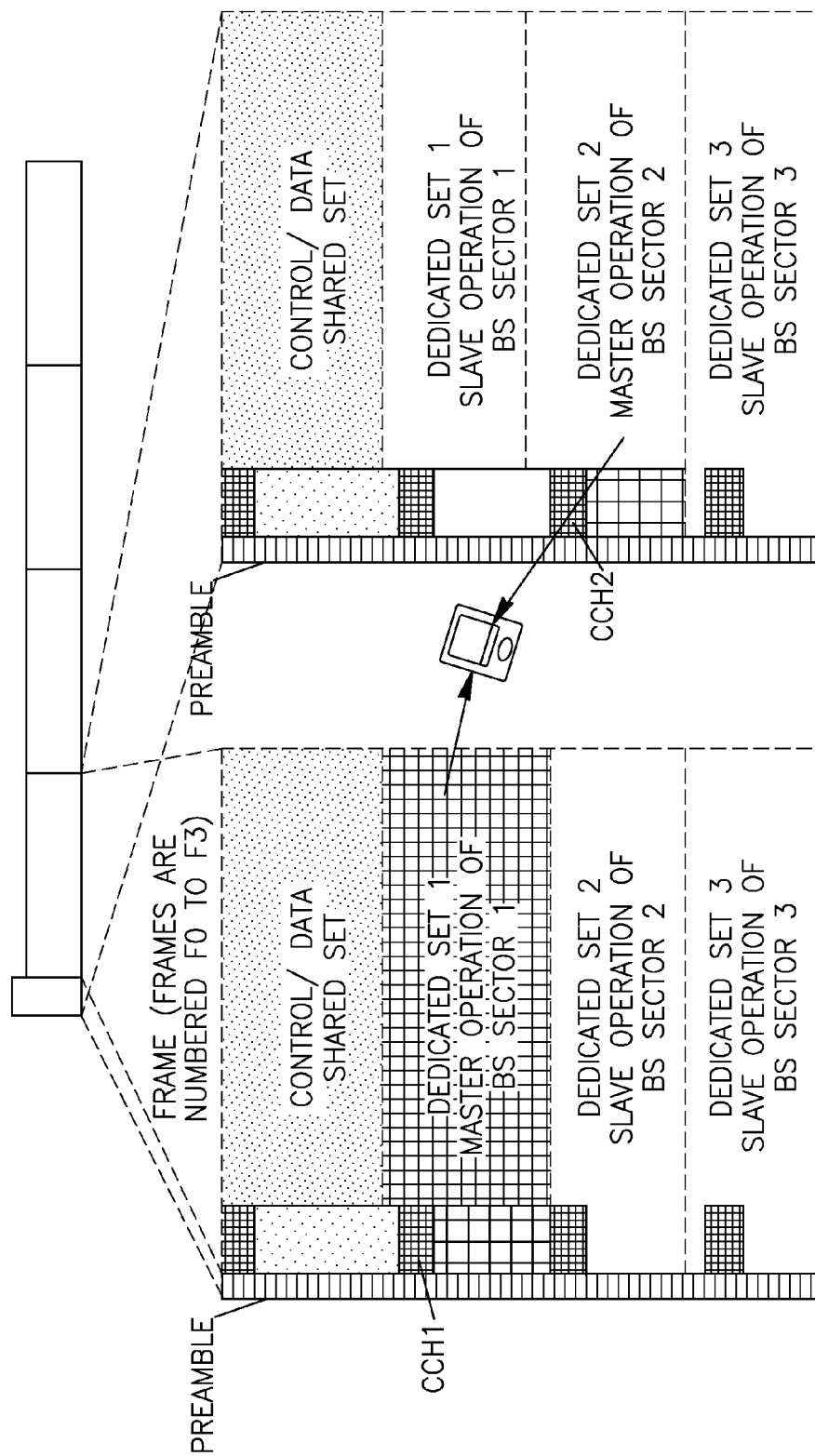
FIG. 1 illustrates an example of frame structure (downlink) as seen by two sectors.

FIG. 1 shows an example of the downlink (DL) operation of the MS. In this example, the MS receives data from two master sectors on different OFDMA SETs. The master sectors may belong to a single base station or to two different base stations, where a base station may use directional or omni-directional sectors.

As may be seen from FIG. 1, the scheme here is actually an FFR (Fractional Frequency Reuse) scheme. The advantage of using this scheme in the frequency domain, is, that the synchronization and control elements can be received at the same time, even if they arrive from different base stations. The guard interval of the OFDM symbol allows some time shift between the signals arriving from different base stations, saving the need for two separated FFT engines. Nevertheless, specific implementations may still use two FFT decoders/encoders.

In the up-link direction, a similar channel division is used for obtaining the SETs. Two different streams may be sent at the same time or with some time shift towards two different base stations (i.e. concurrently). In some cases, when the MS uses the lowest possible modulation and coding rate, it is better to schedule the up-link transmissions in different sub-frames, in order to avoid spectral power density reduction due to the higher number of sub-channels that are used.

In a multi-carrier system, instead of using OFDMA sub-channels, a terminal that uses simultaneously different sub-carriers may also implement the methods described herein for the OFDMA operation.

Different Sub-Frames

While it is more convenient to receive the control information from different base stations in the frequency domain, the data can be transmitted to/received from two different base stations also in time domain, for example while using different sub-frames for carrying out this operation.

Figure 2:
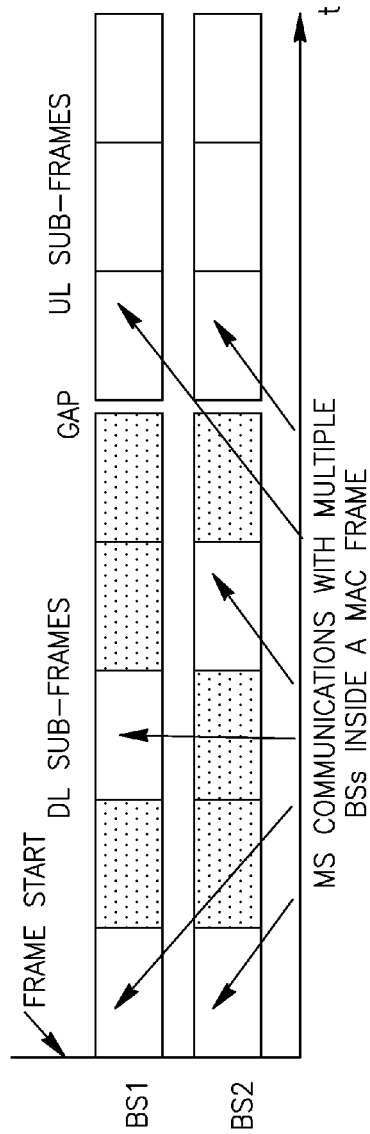
FIG. 2 illustrates an example of an embodiment according to the present invention of using different sub-frames for communications between two base stations and a single subscriber device.

FIG. 2 exemplifies such mode of operation in the downlink direction, where the start of the frame and the up-link are used by MS simultaneously, whereas some DL transmissions are scheduled in different sub-frames. Typically, the control information (e.g. scheduling information) is comprised at the start of the transmitted frame. In this Fig. it was assumed that a radio frame comprises 8 sub-frames. The GAP represents the TDD downlink-uplink transition, and in TDD operation the radio frames may be synchronized.

Notwithstanding the above, it should be noted that also in the up-link direction it is possible to schedule the data transmission in different sub-frames.

A similar scheduling procedure can be applied to FDD operation, but as will be appreciated by those skilled in the art, in such a case no synchronization of radio frames would be required.

Applications Based on Same-Frame MS/SS Operation in Multiple Cells

In the following description a number of possible applications are presented, characterized by having improved performance following the use of the operation mode described above. Some of the applications described hereinafter need the intervention of a gateway or a router, while other applications can be handled directly by a base station or between base stations. In all the cases, stringent synchronization of the data transmissions at the OFDMA symbol level is not required.

Fast Relaying of Inter-BS Messages

The relay operation, described in the IEEE recommendation 802.16j does not address the usage of the MS relay for inter-BS communication.

In certain cases, the MS itself may be used as a relay. The MS needs only one MAC frame to relay the data from one base station to another base station, with the condition that at least one sub-frame will separate the MS downlink from the up-link operation. During the downlink sub-frame the MS receives the data from one base station and during the up-link sub-frame the MS will transmit the data to another base station. If two data streams are processed simultaneously, in most of the situations the base station does not need to be aware of this operation, as the MS will execute its usual operation in addition to the fast relay operation. The resource allocation for the fast inter-BS relay operation can be done on a semi-permanent basis for quasi-fixed MS units by the involved base stations.

Load Balancing

In general there are several types of preferred load balancing. Following are some examples of such possible load balancing:

Load balancing between base stations;
Load balancing between relays belonging to the same base station;
Load balancing between a relay and the base station to which it belongs.

Figure 3:
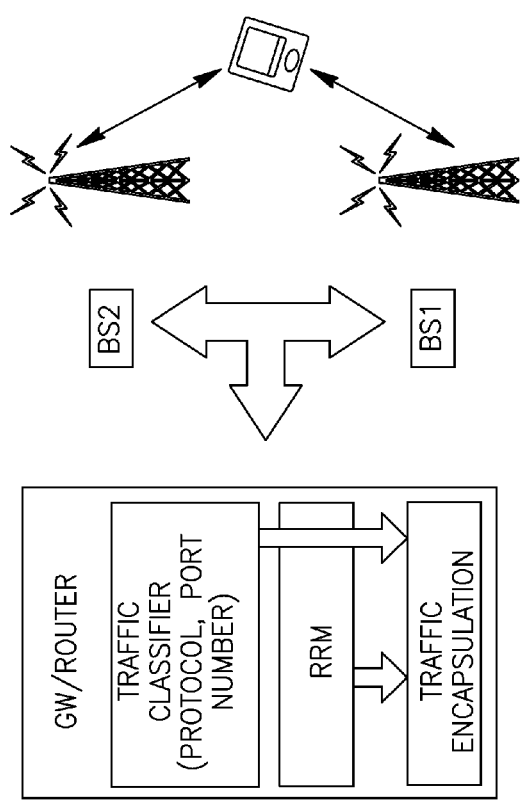
FIG. 3 shows an example of another embodiment of the invention of Network architecture.

The Network architecture, using the Access Server Network Gateway ("ASN GW") or a router, is illustrated in FIG. 3.

The GW/Router may divide the traffic between the two or more base stations. The traffic division may be done according to the protocol type used and the protocol port number. As an alternative, the packets can be simply encapsulated before their transmission towards different base stations. The packets' reordering process at the receiver, based on the packet's sequential number field, will organize the packets by their numerical order.

A Radio Resource Manager is capable of determining the traffic volume that can be transmitted by each of the base stations, based on the available radio resources.

In case of having a load balancing between relays, each relay will use a different dedicated SET and/or a different sub-frame. The base station will route the packets to different relays, which will transmit afterwards the data to the MS.

In case of load balancing between a relay and a base station, only part of the traffic will be routed to one or more relays.

Soft Handover

The network architecture illustrated in FIG. 3 may also be used for a soft handover. It should be noted that there is no need for stringent synchronization of the traffic transmitted to/received from the MS, as in the case of macro-BS diversity.

The same packet may be transmitted twice in a frame using the methods described above. The time/frequency diversity will increase the probability for receiving the packet. The soft-handover which makes use of this method will enjoy lower delay and will take advantage of the transmit diversity in frequency and eventually in time domain.

Multiple MIMO Streams

The inter-cell collaborative MIMO is perceived as having a big potential for increasing the data rates. However, there are some disadvantages associated with this:

the MIMO rate in the operation with every base station is reduced;
stringent synchronization is needed in order to use the same time-frequency resource for two data streams;
MIMO pilots need to be scheduled such that they will not interfere with each other. The channel state matrix can be determined only if the pilots from the two base stations do not interfere with each other.

The method encompassed by the present invention allows for each BS/Relay and MS pair to operate while using separate time-frequency resources and the natural MIMO mode for each MS-BS/Relay pair. In such a way, multiple MIMO streams may be created, either by using separate frequency resources, or by using separate sub-frames or by using a combination thereof. Stringent synchronization is not required and the traffic can be re-arranged by using the packets' sequential number field.

It is to be understood that the above description only includes some embodiments of the invention and serves for its illustration. Numerous other ways of carrying out simultaneous communications between a subscriber station (fixed or mobile) with at least two base stations in wireless telecommunication networks may be devised by a person skilled in the art without departing from the scope of the invention, and are thus encompassed by the present invention. Also, as will be appreciated by those skilled in the art, every such exemplified embodiment has different advantages and also may apply to different implementation approaches for example while implementing various communication protocols such as GSM, LTE, UMTS and the like.

The invention claimed is:

1. A subscriber apparatus for communication involving synchronization and control elements, said subscriber apparatus comprising:
   a device configured to receive first data from a first master sector of a first base station on a first set of sub-channels; and
   a device configured to receive second data from a second master sector of a second base station on a second set of sub-channels, and
   wherein the sub-channels of each base station are allocated on a fractional frequency reuse (FFR) scheme such that the synchronization and control elements can be received at the same time from the first base station and the second base station.

2. The subscriber apparatus of claim 1, further comprising:
   a device configured to receive the first data and the second data using a single Fast Fourier Transform (FFT) engine.

3. The subscriber apparatus of claim 1, further comprising:
   a device configured to send a first stream towards the first base station on the first set of sub-channels; and
   a device configured to simultaneously send a second stream towards the second base station on the second set of sub-channels.

4. The subscriber apparatus of claim 3, wherein the second stream has a time shift relative to the first stream.

5. A method of wireless communication involving synchronization and control elements, the method comprising:
- receiving, by a subscriber device, first data from a first master sector of a first base station on a first set of sub-channels; and
- receiving, by the subscriber device, second data from a second master sector of a second base station on a second set of sub-channels, and
- wherein the sub-channels of each base station are allocated on a fractional frequency reuse (FFR) scheme such that the synchronization and control elements can be received at the same time from the first base station and the second base station.

6. The method of claim 5, further comprising:
- receiving, by the subscriber device, the first data and the second data using a single Fast Fourier Transform (FFT) engine.

7. The method of claim 5, further comprising:
- sending, by the subscriber device, a first stream towards the first base station on the first set of sub-channels; and
- simultaneously sending, by the subscriber device, a second stream towards the second base station on the second set of sub-channels.

8. The method claim 7, wherein the second stream has a time shift relative to the first stream.

* * * * *